(12) United States Patent
Chen et al.

(10) Patent No.: US 7,009,845 B2
(45) Date of Patent: Mar. 7, 2006

(54) BEZEL MOUNTING DEVICE

(75) Inventors: Yun Lung Chen, Tu-Chen (TW); Li Tong, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/920,770

(22) Filed: Aug. 17, 2004

(65) Prior Publication Data

US 2005/0046316 A1  Mar. 3, 2005

(30) Foreign Application Priority Data

Aug. 29, 2003  (TW) .............................. 92215709 U

(51) Int. Cl.
  *G08F 1/20* (2006.01)
(52) U.S. Cl. ................... 361/726; 361/727; 312/223.2; 280/730.2
(58) Field of Classification Search ........ 361/724–727, 361/679–687; 312/223.1–223.6, 283, 285–287, 312/265.5; 280/730.2; 463/19
  See application file for complete search history.

(56) References Cited

U.S. PATENT DOCUMENTS

| 5,123,680 | A | | 6/1992 | Liu | |
|---|---|---|---|---|---|
| 6,542,356 | B1 | * | 4/2003 | Gan | ........................... 361/683 |
| 6,775,144 | B1 | * | 8/2004 | Gan et al. | .................... 361/727 |
| 6,781,843 | B1 | * | 8/2004 | Liu et al. | .................... 361/726 |

FOREIGN PATENT DOCUMENTS

| TW | 200980 | 2/1993 |
|---|---|---|
| TW | 285315 | 9/1996 |

* cited by examiner

Primary Examiner—Hung Van Duong
(74) Attorney, Agent, or Firm—Wei Te Chung

(57) ABSTRACT

A bezel mounting assembly includes a bezel, a front panel, a lock member, and an operation member attached to the front panel. The front panel has a number of slits, two locking holes, and a through hole. The bezel forms a number of hooks engagingly received in the slits of the front panel. The lock member includes a central beam, two side plates, and a resilient portion attached to the bezel and biasing the central beam. Each side plate includes a catch engagingly received in each locking hole of the front panel. The operation member includes a drive body and a press body. When the drive body is pressed downwardly, the press body is rotated accordingly to press the central beam downwardly. The catches and the hooks are thereby released from engagement, then the bezel is fully detached from the front panel.

16 Claims, 4 Drawing Sheets

BEZEL MOUNTING DEVICE

BACKGROUND OF THE INVENTION

1. Field of the Invention

The present invention relates to a mounting assembly, and more particularly to a computer bezel mounting assembly with a simplified configuration and convenient usability. The invention relates to a contemporarily filed application titled "BEZEL MOUNTING DEVIE" having one same inventor and the same assignee with the instant invention.

2. Description of the Related Art

A conventional front bezel is mounted to a computer case by means of a plurality of set screws or fasteners being attached to the bezel and engaged in a plurality of fixing holes defined in the computer case. A typical bezel mounting assembly is disclosed in Taiwan Patent No. 285315. The mounting assembly comprises a chassis and a front bezel. Two sidewalls of the chassis define a plurality of receiving slots in respective front portions thereof. Side edges of the bezel have a plurality of barbs engaging in the corresponding slots of the chassis, thereby connecting the front bezel to the chassis. However, this mounting assembly requires the bezel to have a number of barbs, which makes detachment of the bezel from the chassis inconvenient and laborious. Additionally, the barbs are easily broken when too much force is applied thereon during the detachment process.

Another typical bezel mounting assembly is disclosed in Taiwan Patent No. 200980. The bezel mounting assembly comprises a front bezel, a chassis and a plurality of metal clip members mounted on top of corresponding pillars formed on the bezel. A circumferential edge of the chassis defines a plurality of slots corresponding to the arrangement of the pillars. Each metal clip comprises a planar fixing portion, a vertical supporting portion, and a guiding portion. A mounting dent is defined between the supporting portion and the guiding portion. The guiding portion passes through the corresponding slot of the chassis until an inner edge of the chassis at the slot is blocked in the mounting dent. The bezel is thereby mounted to the chassis. This mounting assembly requires a plurality of additional separate members (i.e., the metal clips) in order to mount the bezel. Moreover, it is rather inconvenient and laborious to detach all the clip members tightly engaged in the slots. Another similar structure is also disclosed in U.S. Pat. No. 5,123,680.

Thus, an improved mounting apparatus for bezel which overcomes the above-mentioned problems is desired.

BRIEF SUMMARY OF THE INVENTION

Accordingly, an object of the present invention is to provide a mounting assembly which readily attaches a computer bezel to a front panel of a computer cage, and detaches the computer bezel therefrom.

Another object of the present invention is to provide a mounting assembly having a simplified configuration and convenient usability.

To achieve the above objects, a mounting assembly of the present invention comprises a bezel, a front panel, a lock member, and an operation member attached to the front panel. The front panel has a number of slits, two locking holes, and a through hole. The bezel forms a number of hooks engagingly received in the slits of the front panel. The lock member comprises a central beam, two side plates, and a resilient portion attached to the bezel and biasing the central beam. Each side plate comprises a catch engagingly received in each locking hole of the front panel. The operation member comprises a drive body and a press body. When the drive body is pressed downwardly, the press body is rotated to press the central beam downwardly. The catches and the hooks are released from engagement, then the bezel is fully detached from the front panel.

Other objects, advantages and novel features of the present invention will become more apparent from the following detailed description when taken in conjunction with the accompanying drawings, in which:

DETAILED DESCRIPTION OF THE INVENTION

Figure 1:
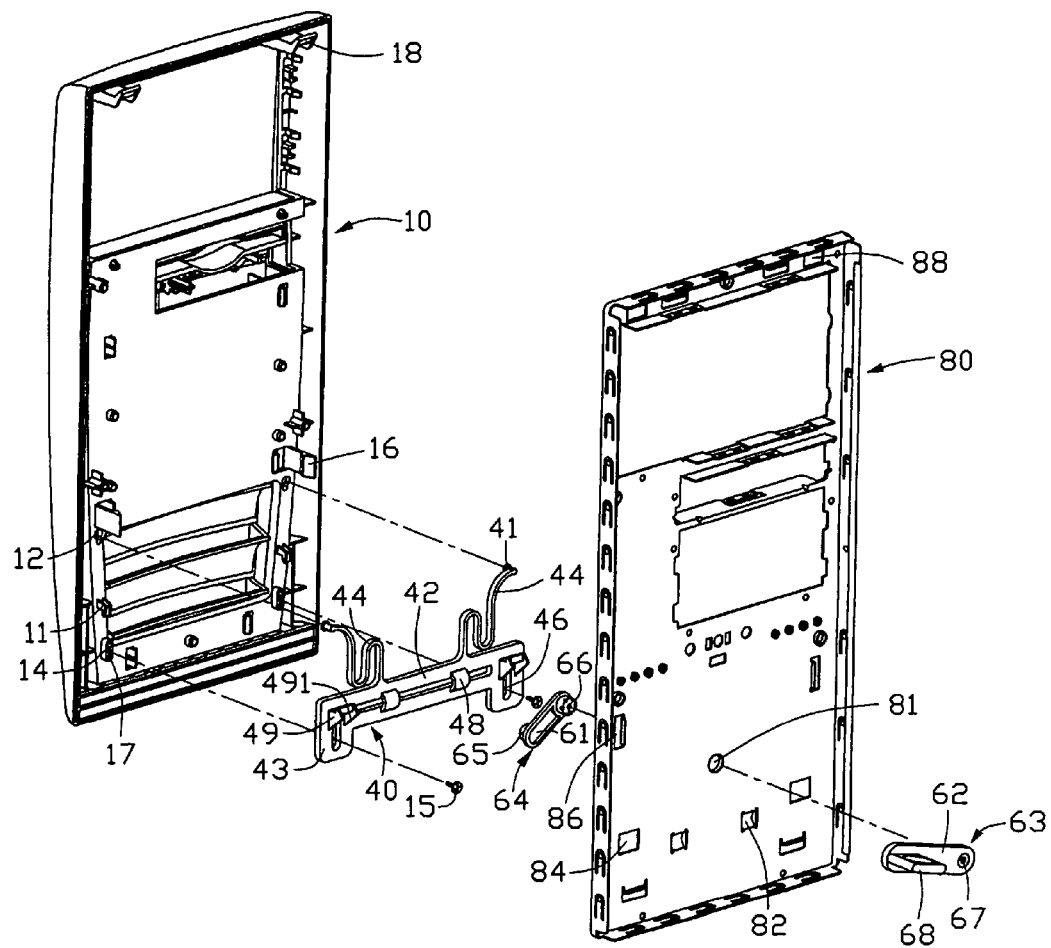
FIG. 1 is an exploded, isometric view of a mounting assembly in accordance with the present invention.
Figure 3:
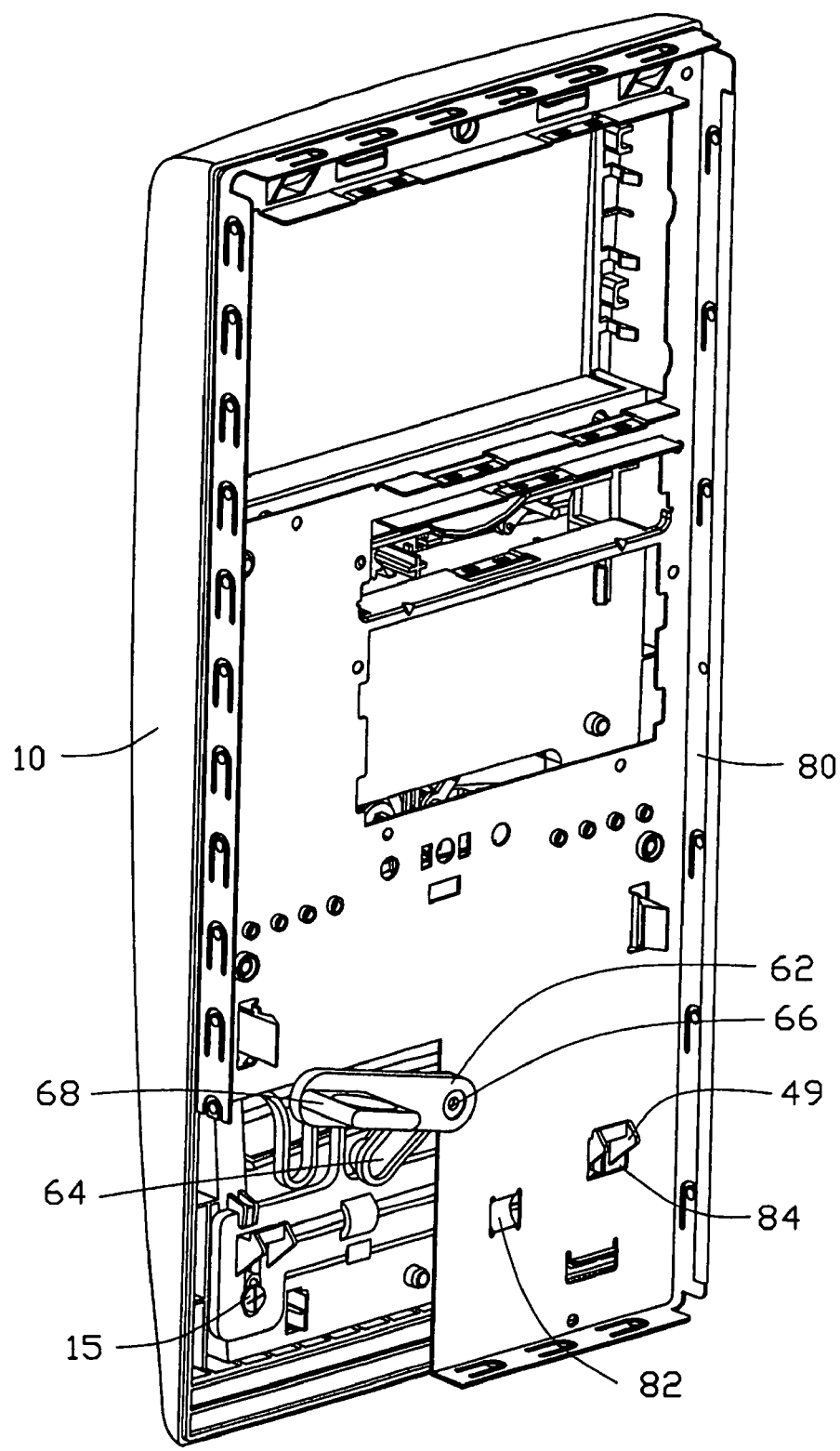
FIG. 3 is a fully assembled view of FIG. 1, but showing the lock member in a locked state and a part of the bezel cut away.

Referring to FIGS. 1 and 3, a bezel mounting assembly in accordance with a preferred embodiment of the present invention is for mounting a bezel 10 to a front panel 80 of a computer chassis (not shown). The bezel mounting assembly comprises a lock member 40, and an operation member comprising a drive body 63 and a press body 64.

The bezel 10 is generally rectangular. Two pairs of first hooks 18 and second hooks 16 are inwardly formed from a top portion and a middle portion of the bezel 10. A pair of guiding openings 12 is defined under the second hooks 16 respectively. Each opening 12 comprises a larger portion and a narrower portion. A pair of posts 14 is formed inwardly and symmetrically from a bottom portion of the bezel 10. A screw aperture 17 is defined in each post 14, for receiving a screw 15. A pair of barbs 11 is formed above the posts 14 respectively.

A pair of first slits 88 is defined in a top portion of the front panel 80, corresponding to the first hooks 18 of the bezel 10. A pair of second slits 86 is defined in the front panel 80, corresponding to the second hooks 16 of the bezel 10. A pair of locking holes 84 is symmetrically defined in a lower portion of the front panel 10. A pair of convex protrusions 82 extends outwardly from the front panel 80. A through hole 81 is defined in the front panel above the protrusions 82, generally between the protrusions 82.

The lock member 40 has a symmetric configuration and is attached to the bezel 10. The lock member 40 comprises a central beam 42, a pair of side plates 43, and a pair of resilient members 44. The side plates 43 are formed at opposite sides of the central beam 42 respectively. A pair of convex second protrusions 48 extends rearward from the beam 21, for engaging with the protrusions 82 of the front panel 80. Each side plate 22 defines a vertical through slots 46, for slidably receiving the posts 14 of the bezel 10. A pair of catches 49 extends rearwardly above the through slot 46 respectively, for engaging in the locking holes 84 of the front panel 80. Each of the catches has a bevel 491. The resilient members 44 are formed at an upper edge of the central beam 42. Each resilient member 44 is a cantilever member. A pin 41 is formed at a free end of each resilient member 44 with an enlarged head portion (not labeled) thereon. The guide openings 12 of the bezel 10 are configured to constrain the enlarged head portion of the pin 41. The screws 15 engaging in the aperture 17 of the post 14 is for preventing the lock member 40 moving away from the bezel 10 when the lock member 40 is attached to the bezel 10.

The press body 64 and the drive body 63 are positioned in opposite locations of the front panel 80, with the press body 64 disposed between the bezel 10 and the front panel 80. The press body 64 comprises a main portion 61, a bulge 65 vertically extending from an end of the main portion 61 in a first direction, and a connecting portion 66 vertically extending from another end of the main portion 61 in a second direction. The connecting portion 66 defines a pinion gear (not labeled) therein. The drive body 63 comprises a main portion 62, a handle 68 and a combine portion 67. The combine portion 67 defines a ring gear (not labeled) that is in engagement with the pinion gear of the connecting portion 66 of the drive body 63.

Figure 2:
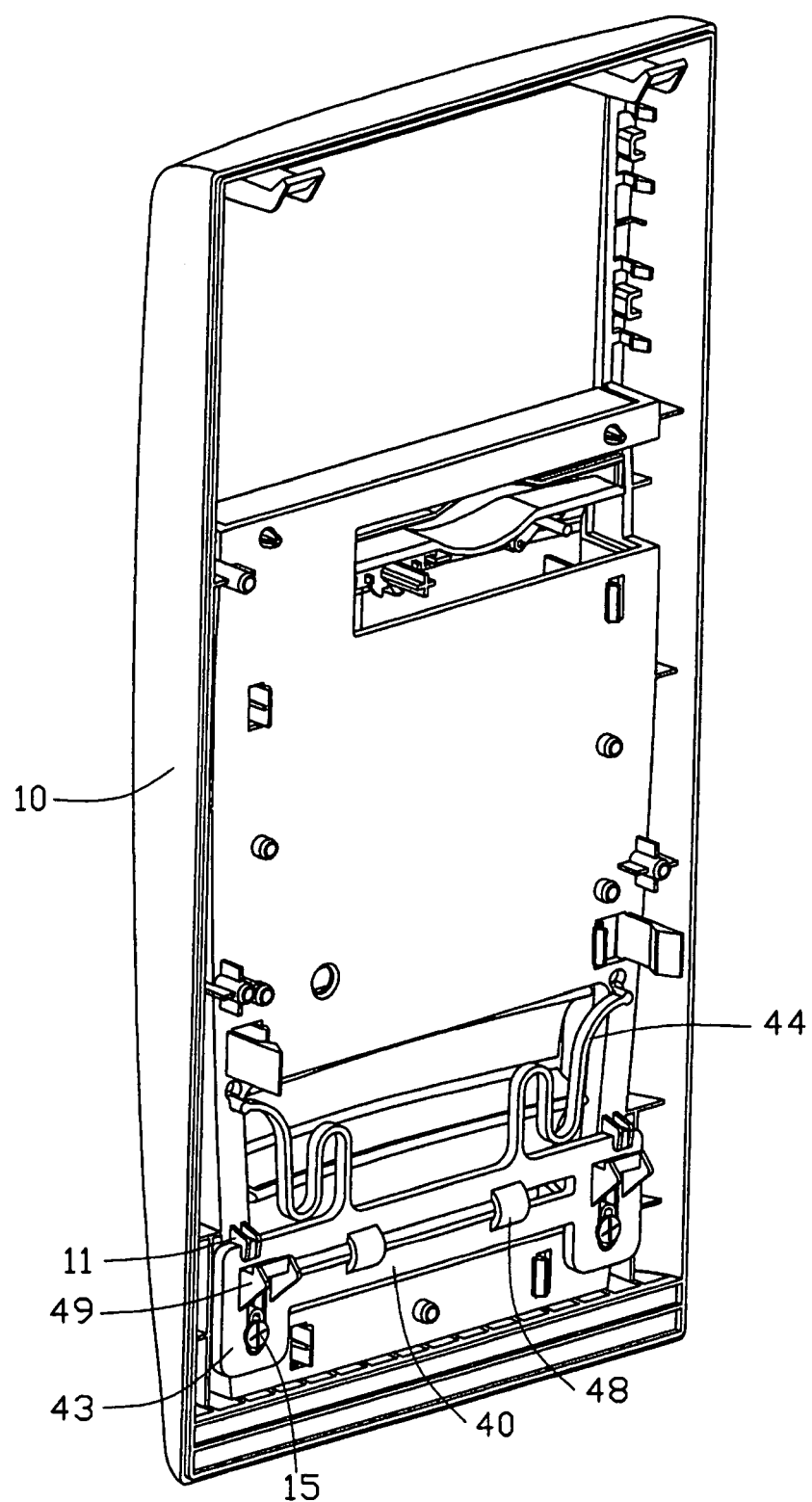
FIG. 2 is a sub-assembled view of a bezel and a lock member of FIG. 1.
Figure 4:
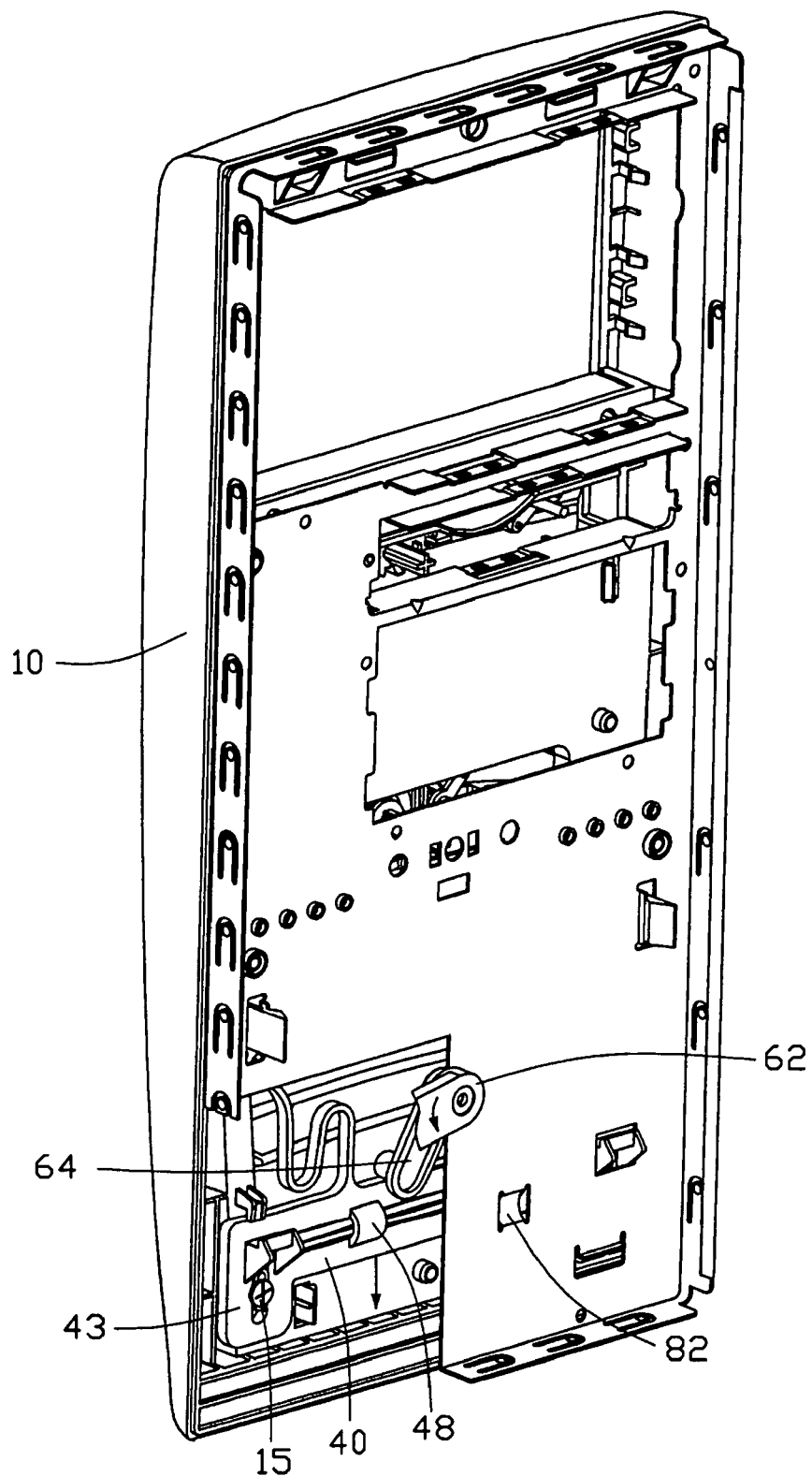
FIG. 4 is similar to FIG. 3, but showing the lock member in a unlocked state.

Referring also to FIGS. 2 to 4, in pre-assembly, the pins 41 of the resilient members 44 of the lock member 40 are slid through larger portions of the guiding openings 12, and then retained in smaller portions of the guiding openings 12 of the bezel 10, thereby the lock member 40 is attached to the bezel 10. In another embodiment of the invention, the resilient members 44 can be attached to the bezel 10 by screws. The posts 14 of the bezel 10 are slidably received in the through slots 46 of the side plates 43, with the screws 15 engaged in the screw holes 17 of the posts 14. The barbs 11 engage with the upper edge of the central beam 42. Thus the lock member 40 is prevented from being accidentally detached from the bezel 10. The connecting portion 66 of the press body 64 penetrates through the through hole 81 of the front panel 80, and engages with the combine portion 67 of the drive body 63. Then the press body 64 and the drive body 63 are combined together, thus the operation member is rotatably attached to the front panel 80.

In assembly, the combined bezel 10 and operation member are then attached to the front panel 80. The first and second hooks 18, 16 of the bezel 10 are respectively engaged in the corresponding first slits 88 and second slits 86 of the front panel 80. The catches 49 engage in the locking holes 84. The bezel 10 is thus securely attached to the front panel 80. The bulge 65 of the press body 64 is abutting the upper edge of the beam 42 of the lock member 40.

In disassembly, the handle 68 is pushed downwardly. The drive body 63 drives the press body 64 to rotate toward the lock member 40, so that the bulge 65 presses the lock member 40 to move downwardly. The catches 49 are disengaged from the locking holes 84 of the panel 80 along the bevel 491. The second protrusions 48 ride upwardly along the first protrusions 82, and a bottom portion of the bezel 10 is thereby driven outwardly from the front panel 80. The hooks 18 and 16 of the bezel 10 are disengaged from the slits 88, 86 of the front panel 80. Thus, the bezel 10 is fully detached from the front panel 30.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting assembly comprising:
    a bezel comprising a plurality of hooks;
    a front panel attached to the bezel, the front panel comprising a plurality of slits engaging with the hooks, a pair of locking holes, and a through hole;
    a lock member attached to the bezel and securing the bezel to the front panel, the lock member comprising a beam, and a pair of resilient members extending from the beam, two catches formed from opposite sides of the beam and engaging in the locking holes of the front panel, the resilient members being attached to the bezel thereby the beam is resiliently movable; and
    an operation member comprising a drive body and a press body, the press body and the drive body respectively positioned in opposite surfaces of the front panel, and rotatably connected with each other via the through hole of the front panel, the press body located between the front panel and the bezel;
    wherein in detaching the bezel from the front panel, rotate the drive body so that the press body is driven accordingly to press the beam of the lock member to move, the catches are thereby released from the locking holes of the front panel, the hooks of the bezel are then disengaged from the slits of the panel.

2. The mounting assembly as claimed in claim 1, wherein each of the catches forms a bevel at an underside thereof.

3. The mounting assembly as claimed in claim 1, wherein each of the opposite sides of the beam defines a vertical through slots, a pair of posts is formed from the bezel, the posts are slidably received in the through slots.

4. The mounting assembly as claimed in claim 1, wherein a pin is formed at a free end of each of the resilient members with an enlarged head portion thereon, a pair of guiding opening is defined in the bezel, the pins are slidably received in the guiding opening to attach the resilient members to the bezel.

5. The mounting assembly as claimed in claim 1, wherein the drive body comprises a handle.

6. The mounting assembly as claimed in claim 1, wherein a pair of convex protrusions extends toward each other respectively from the lock member and the front panel, in disassembly, one of the protrusions ride along the other one, the bezel is thereby driven outwardly from the front panel.

7. The mounting assembly as claimed in claim 3, wherein a screw is installed in each of the posts of the bezel for preventing the lock member moving away from the bezel.

8. An assembly comprising:
    a bezel having at least one hook and at least one post;
    a front panel having at least one slit for engagingly receiving the at least one hook, and at least one locking hole;
    a lock member defining at least one vertical slot, and forming a resilient member extending therefrom, the resilient member having one end secured to the bezel, the at least one post of the front panel slidably received in the at least one vertical slot, at least one catch extending from the locking member to releasably engage in the at least one locking hole; and
    an operation member comprising a press body and a drive body connecting with each other and respectively locating at front and rear sides of the front panel;
    wherein the drive body is rotated, the press body is rotated accordingly to drive the lock member to move in a vertical direction, so that the at least one catch is released from the at least one locking hole, and the at least one hook is disengaged from the at least one slit.

9. The bezel mounting assembly as claimed in claim 8, wherein a pair of convex protrusions extends toward each other respectively from the lock member and the front panel, in disassembly, one of the protrusions ride along the other one, the bezel is thereby driven outwardly from the front panel.

10. The bezel mounting assembly as claimed in claim 8, wherein the front panel has a through hole, the press body comprises a connecting portion, the drive body comprises a combine portion, the connecting portion passes through the through hole of the front panel and engages with the combine portion.

11. The bezel mounting assembly as claimed in claim 8, wherein a pair of barbs is formed on the bezel for engaging with the lock member.

12. The bezel mounting assembly as claimed in claim 10, wherein the press body comprises a bulge for pressing the lock member.

13. A mounting assembly comprising:
   a panel defining first and second end securing devices along a lengthwise direction;
   a bezel including at least one hook latchably engaged within the first end securing device of the panel;
   a locking device attached to the bezel and securing the bezel to the panel in a front-to-back direction perpendicular to said lengthwise direction, said locking device being retractably moveable along said lengthwise direction, said locking device defining a catch latchably engaged within the second end securing device of the panel, said locking device essentially located between the panel and bezel while being operable via a handle accessible from a space behind aid panel; wherein the bezel is assembled to the panel in a rotation movement about an axis defined by engagement between the hook and the first end securing device and eventually fully locked to the panel by means of the catch being locked to the second end securing device.

14. The mounting assembly as claimed in claim 13, wherein said handle is rotatably moveable to actuate releasing of the locking device from the second end securing device.

15. The mounting assembly as claimed in claim 13, wherein said first securing end device is an aperture.

16. The mounting assembly as claimed in claim 13, wherein said second securing end device is an aperture.

* * * * *